(12) United States Patent
Tsui et al.

(10) Patent No.: US 11,528,457 B2
(45) Date of Patent: Dec. 13, 2022

(54) PROJECTION APPARATUS AND DIRECT SETTING METHOD OF PROJECTION IMAGE

(71) Applicant: Optoma Corporation, New Taipei (TW)

(72) Inventors: Yuan-Mao Tsui, New Taipei (TW); Yu-Cheng Lee, New Taipei (TW)

(73) Assignee: Optoma Corporation, New Taipei (TW)

( * ) Notice: Subject to any disclaimer, the term of this patent is extended or adjusted under 35 U.S.C. 154(b) by 0 days.

(21) Appl. No.: 17/378,806

(22) Filed: Jul. 19, 2021

(65) Prior Publication Data

US 2022/0038665 A1 Feb. 3, 2022

(30) Foreign Application Priority Data

Jul. 30, 2020 (CN) .......................... 202010748598.8

(51) Int. Cl.
*G06F 3/02* (2006.01)
*H04N 9/31* (2006.01)

(52) U.S. Cl.
CPC .............. *H04N 9/3141* (2013.01); *G06F 3/02* (2013.01); *H04N 9/3182* (2013.01); *H04N 9/3188* (2013.01)

(58) Field of Classification Search
CPC .. H04N 9/3141; H04N 9/3182; H04N 9/3188; H04N 9/3179; H04N 9/317; G06F 3/02; A63F 13/52; G03B 21/00
See application file for complete search history.

(56) References Cited

U.S. PATENT DOCUMENTS

2004/0227911 A1* 11/2004 Salvatori ................. H04N 5/74
348/E5.103

FOREIGN PATENT DOCUMENTS

| CN | 1898708 | 1/2007 |
|----|---------|--------|
| CN | 101095080 | 12/2007 |
| CN | 101518067 | 8/2009 |
| CN | 102200679 | 9/2011 |
| CN | 102318350 | 1/2012 |
| CN | 105202444 | 12/2015 |
| CN | 209949308 | 1/2020 |
| TW | 200527110 | 8/2005 |
| TW | 200905364 | 2/2009 |

* cited by examiner

*Primary Examiner* — Rodney Amadiz
(74) *Attorney, Agent, or Firm* — JCIPRNET

(57) ABSTRACT

A projection apparatus and a direct setting method of a projection image are provided. The projection apparatus includes a projection device, an input interface, and a processing device. The input interface is configured to provide a plurality of setting items. The processing device is coupled to the projection device. When the projection device projects a projection image, the processing device is configured to directly set an image format of the projection image according to a setting signal provided by the input interface in response to selection of one of the setting items. The disclosure provides a fast image format setting function for the projection image.

20 Claims, 4 Drawing Sheets

PROJECTION APPARATUS AND DIRECT SETTING METHOD OF PROJECTION IMAGE

CROSS-REFERENCE TO RELATED APPLICATION

This application claims the priority benefit of China application serial no. 202010748598.8, filed on Jul. 30, 2020. The entirety of the above-mentioned patent application is hereby incorporated by reference herein and made a part of this specification.

BACKGROUND

Technical Field

The disclosure relates to a projection control technology, and particularly relates to a projection apparatus and a direct setting method of a projection image.

Description of Related Art

Regarding general projection apparatus, when the projection apparatus is projecting a projection image, if a user wants to set or switch an image format of the projection image in real-time, the user has to operate the projection apparatus to perform selection through related setting options in an on screen display (OSD) menu displayed in the projection image by the projection apparatus, so as to implement a switching or setting operation of the image format of the projection image. Therefore, the general projection apparatus cannot provide a convenient and real-time setting or switching function for the image format of the projection image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to a projection apparatus and a direct setting method of a projection image, capable of providing fast image format setting function of a projection image.

Other objects and advantages of the disclosure may be further illustrated by the technical features broadly embodied and described as follows.

In order to achieve one or a portion of or all of the objects or other objects, the disclosure provides a projection apparatus including a projection device, an input interface, and a processing device. The input interface is configured to provide a plurality of setting items. The processing device is coupled to the projection device. When the projection device projects a projection image, the processing device is configured to directly set an image format of the projection image according to a setting signal provided by the input interface in response to selection of one of the setting items.

In order to achieve one or a portion of or all of the objects or other objects, the disclosure provides a direct setting method of a projection image, which is adapted to projection apparatus. The projection apparatus includes a projection device, an input interface, and a processing device. The direct setting method includes following steps. The projection image is projected through the projection device. A setting signal provided by the input interface in response to selection of one of a plurality of setting items is provided to the processing device. An image format of the projection image is directly set by the processing device according to the setting signal.

Based on the above description, in the projection apparatus and the direct setting method of the projection image of the disclosure, by additionally designing a special input interface on the projection apparatus, the user is capable of quickly switching the image format of the projection image.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
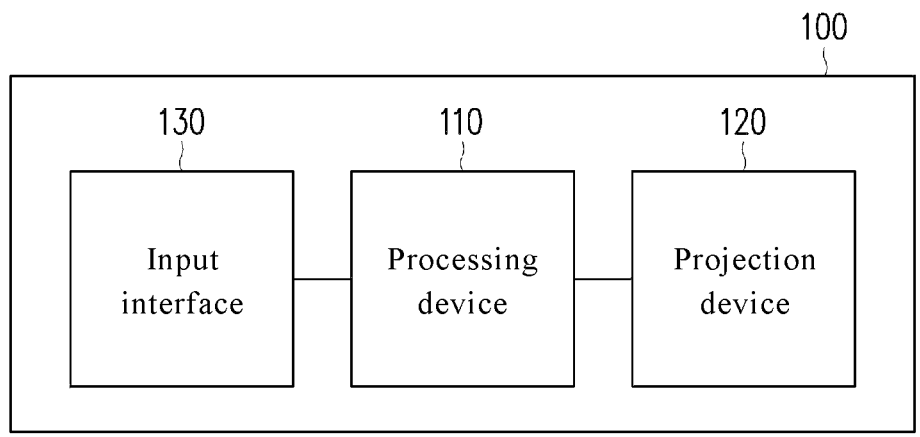
FIG. 1 is a block schematic diagram of projection apparatus according to an embodiment of the disclosure.

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "left," "right," "front," "back," etc., is used with reference to the orientation of the Figure(s) being described and are not intended to be limiting of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block schematic diagram of projection apparatus according to an embodiment of the disclosure. Referring to FIG. 1, a projection apparatus 100 (for example, a projector) includes a processing device 110, a projection device 120 and an input interface 130. The processing device 110 is coupled to the projection device 120 and the input interface 130. In the embodiment, the processing device 110 is configured to drive and control the projection device 120 to implement a projection function, and when the projection device 120 performs projection, the processing device 110 may receive a setting signal provided by the input interface 130 to directly set an image format of a projection image projected by the projection device 120. The input interface 130 may include a physical unit provided on a body of the projection apparatus 100, such as a knob or a button. For example, when the projection device 120 projects the projection image onto a projection surface (a projection screen or a wall, etc.), a user may operate the input interface 130 through a mechanical operation to switch or set the image format of the projection image. Moreover, during a switching process of the image format, the projection device 120 may directly change the image format of the projection image according to a setting signal provided by the input interface 130, so as to achieve a fast switching effect.

In the embodiment, the processing device 110 may be, for example, a central processing unit (CPU), or other programmable general-purpose or special-purpose microprocessor, a digital signal processor (DSP), a programmable controller, application specific integrated circuits (ASIC), a programmable logic device (PLD), other similar processing devices or a combination of these devices. The projection apparatus 100 may further include a memory (Memory), and the memory is used to store related projector control programs, projection image data, etc., for the processing device 110 to access and execute.

In the embodiment, the projection device 120 may include a light source module, an optical engine module, a projection lens group, an image transmission interface, and other related circuit elements. The light source module may include a light-emitting unit such as a discharge bulb, a light-emitting diode, or a laser light source. The optical engine module may include a reflective spatial light modulator or a transmissive spatial light modulator. The reflective spatial light modulator may be, for example, reflective liquid crystal on silicon (LCOS) or a digital micro-mirror device (DMD). The transmissive spatial light modulator may be, for example, a transparent liquid crystal panel. The projection lens group may include a plurality of lenses, and the plurality of lenses may form a projection optical path.

Figure 2A:
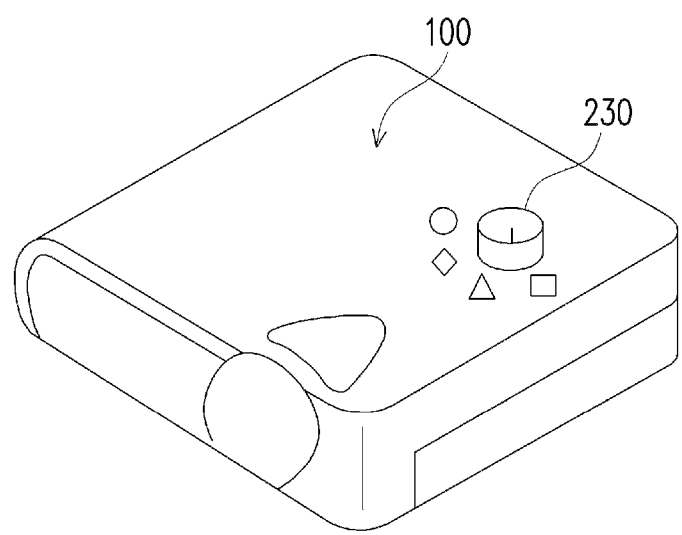
FIG. 2A is a schematic diagram of projection apparatus with a knob according to an embodiment of the disclosure.

FIG. 2A is a schematic diagram of projection apparatus with a knob according to an embodiment of the disclosure. The input interface 130, such as a knob 230, may be provided on an upper surface of the projection apparatus 100, which allows the user to directly change the image format of the projection image in an intuitive and easy way to achieve a fast switching effect.

Figure 2B:
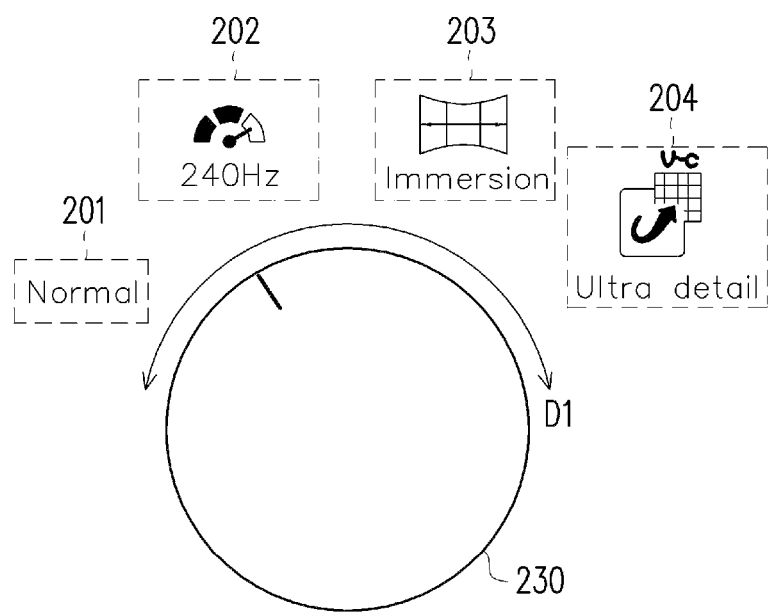
FIG. 2B is a schematic diagram of the knob of FIG. 2A according to an embodiment of the disclosure.

FIG. 2B is a schematic diagram of the knob of FIG. 2A according to an embodiment of the disclosure. Referring to FIG. 1, FIG. 2A and FIG. 2B, in the embodiment, the knob 230 may include a plurality of switching states, for example, the knob 230 shown in FIG. 2B may have four rotation positions (or angles) along a rotation direction D1 for corresponding to four setting items 201-204, respectively. The four setting items 201-204 may include, for example, a normal projection item, a frame update rate setting item, a frame ratio setting item, and a frame brightness setting item, but the number of the setting items and setting types of the disclosure are not limited thereto. In an embodiment, the knob 230 may also provide setting options for other special projection items. In the embodiment, the knob 230 may be provided on a body of the projection device 100, so that the user may directly switch or directly set the image format of the current projection image by directly operating (rotating) the knob 230 during the projection process. In other words, the user does not need to operate the projection apparatus 100 to enter an on screen display (OSD) menu of the projection apparatus 100 in order to switch or set the image format of the current projection image. It should be noted that the input interface 130 of the embodiment may generate different setting signals to the projection device 120 according to different setting items selected by the knob 230.

For example, when the user wants to operate the projection device 120 of the projection apparatus 100 to project a game image with a high-speed dynamic visual effect, the user may rotate the knob 230 to make a pointer to point to the setting item 202. In this way, the input interface 130 may correspondingly provide the setting signal to the processing device 110 in response to selection of the frame update rate setting item (the setting item 202), and the processing device 110 directly sets the projection device 120 to project the projection image at a specific frame update rate, and the specific frame update rate may be, for example, 240 Hz.

Alternatively, when the current projection image projected by the projection device 120 cannot fully display image content of image data or a current frame ratio does not match a format of the image data, the user may rotate the knob 230 to make the pointer to point to the setting item 203. In this way, the input interface 130 may correspondingly provide the setting signal to the processing device 110 in response to selection of the frame ratio setting item (the setting item 203), and the processing device 110 directly sets the projection device 120 to project the projection image at a specific frame ratio, and the specific frame ratio is, for example, 32:9, and an original frame ratio is, for example, 16:9.

Alternatively, when image content of a dark region or a bright region in the current projection image projected by the projection device 120 is not clear, the user may rotate the knob 230 to make the pointer to point to the setting item 204. In this way, the input interface 130 may correspondingly provide the setting signal to the processing device 110 in response to selection of the frame brightness setting item (the setting item 204), and the processing device 110 directly sets the projection device 120 to project the projection image at a specific frame brightness, where the specific frame brightness setting may be used to enhance image details of the dark or bright region of the projection image.

Namely, the input interface 130 may provide the corresponding setting signal to the processing device 110 in response to selection of a certain special projection item, so that the processing device 110 may directly set the projection device 120 to project the projection image in the special projection mode. Moreover, when the user wants to restore the projection image to a default image format, the user only needs to rotate the knob 230 to make the pointer to point to the setting item 201. In this way, the input interface 130 may provide the corresponding setting signal to the processing device 110 in response to selection of the normal projection item (the setting item 201), and the processing device 110 directly sets the projection device 120 to quickly switch to the normal projection mode for projecting the projection image.

Figure 3:
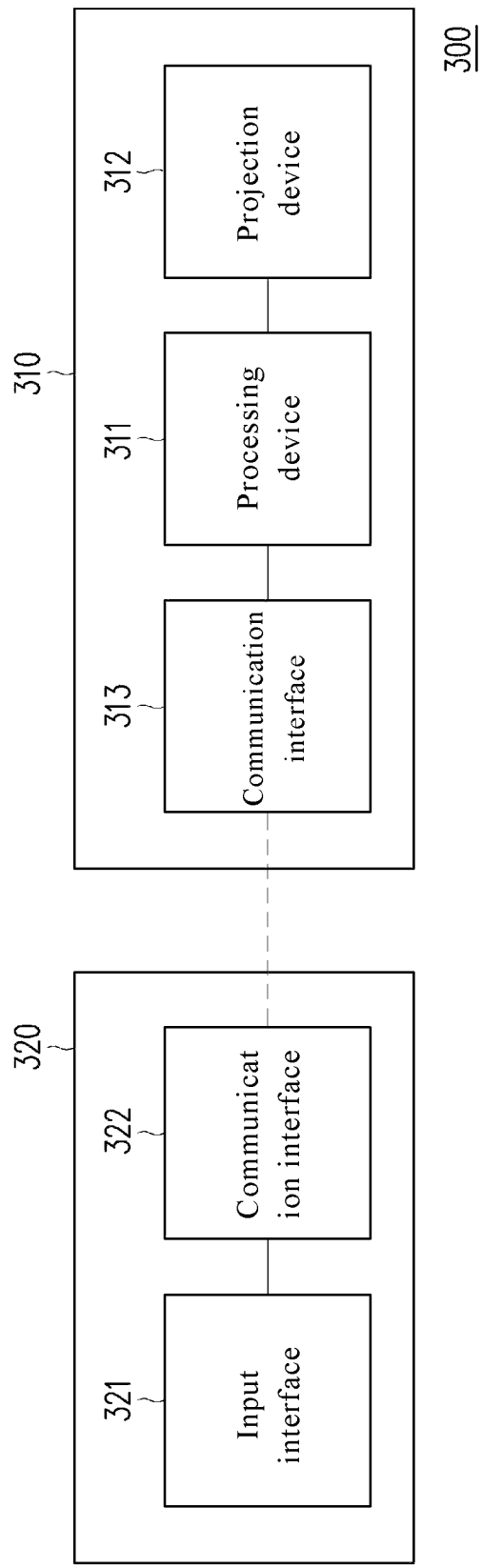
FIG. 3 is a block schematic diagram of projection apparatus according to another embodiment of the disclosure.

FIG. 3 is a block schematic diagram of a projection apparatus according to another embodiment of the disclosure. Referring to FIG. 3, a projection apparatus 300 includes a body 310 and a remote control device 320. The body 310 includes a processing device 311, a projection device 312, and a communication interface 313. The remote control device 320 includes an input interface 321 and a communication interface 322. In the embodiment, the communication interfaces 313 and 322 may implement communication through a cable or a wireless method, such as Wi-Fi or Bluetooth. The processing device 311 is used to drive and control the projection device 312 to perform projection, and when the projection device 312 performs projection, the processing device 311 may receive a setting signal provided by the input interface 321 through the communication interfaces 313, 322 to directly set the image format of the projection image projected by the projection device 312. The input interface 321 may include a physical unit provided on the remote control device 320 of the projection apparatus 300, such as a knob or a button. For example, when the projection device 312 projects the projection image to a projection surface, the user may remotely switch or set the image format of the projection image by operating the input interface 321, and the projection image may be directly changed according to the setting signal provided by the input interface 321 during the switching process, so as to achieve the fast switching effect.

It should be noted that the descriptions of the processing device 110 and the projection device 120 in the embodiment of FIG. 1, FIG. 2A and FIG. 2B may be referred for relevant implementation and technical details of the processing device 311 and the projection device 312 of the body 310 of the embodiment, and details thereof are not repeated. In addition, the descriptions of the input interface 130 and the knob 230 in the embodiment of FIG. 1, FIG. 2A, and FIG. 2B may be referred for the relevant implementation and technical details of the input interface 321 of the embodiment, and details thereof are not repeated. In other words, compared with the embodiment of FIG. 1, the projection apparatus 300 of the embodiment provides an additional physical unit on the remote control device 320 for the user to remotely set or switch the image format of the projection image in real time.

Figure 4:
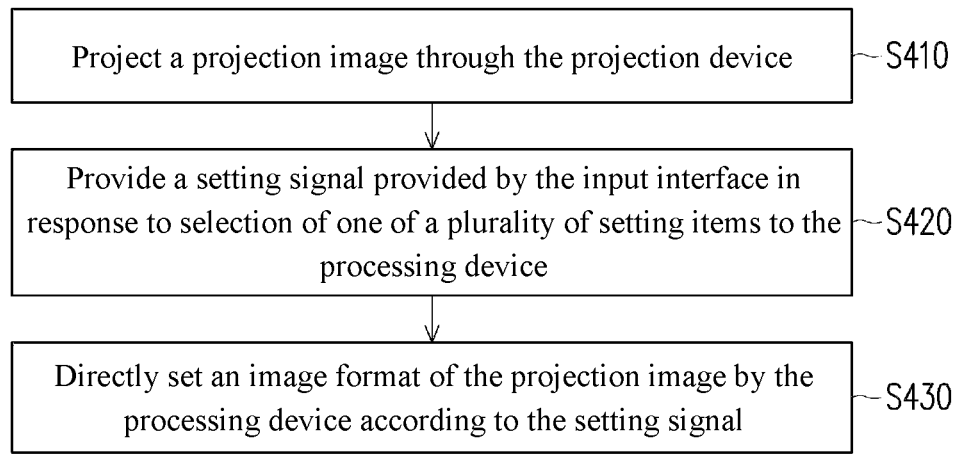
FIG. 4 is a flowchart illustrating a direct setting method of a projection image according to an embodiment of the disclosure.

FIG. 4 is a flowchart illustrating a direct setting method of a projection image according to an embodiment of the disclosure. The direct setting method of the projection image of the embodiment may be adapted to the projection apparatus 100 or 300 of FIG. 1 or FIG. 3, and the following description is made based on FIG. 1. Referring to FIG. 1 and FIG. 4, in step S410, the projection device 120 projects the projection image. In step S420, the input interface 130 provides a setting signal to the processing device 110 in response to selection of one of a plurality of setting items. In step S430, the processing device 110 directly sets an image format of the projection image according to the setting signal. Therefore, the direct setting method of the projection image of the embodiment may achieve the fast switching effect of the image format of the projection image.

In addition, regarding the related technical details of the projection apparatus 100 of the embodiment and the related extended description of the direct setting method of the projection image of the embodiment, reference may be made to the descriptions of the above-mentioned embodiments of FIG. 1 to FIG. 3 to obtain sufficient teachings, suggestions, and implementation descriptions, and details thereof are not repeated.

In summary, the embodiments of the disclosure have at least one of following advantages of effects. In the projection apparatus and the direct setting method of the projection image of the disclosure, when the projection device performs the projection operation of the projection image, the user may perform a mechanical operation on the specially designed input interface, and the input interface may provide the corresponding setting signal to the projection device in response to the operation result of the user, so as to directly set the image format of the projection image projected by the projection device. Therefore, the projection apparatus and the projection image of the disclosure may provide convenient and fast setting or switching effect of the image format of the projection image.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents. Moreover, any embodiment of or the claims of the disclosure is unnecessary to implement all advantages or features disclosed by the disclosure. Moreover, the abstract and the name of the disclosure are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projection apparatus, comprising a projection device, an input interface, and a processing device, wherein
the input interface is configured to provide a plurality of setting items,
wherein the setting items comprise a frame update rate setting item, and the input interface correspondingly provides a setting signal to the processing device in response to selection of the frame update rate setting item, such that the processing device directly sets the projection device to project a projection image at a specific high-speed frame update rate; and
the processing device is coupled to the projection device, wherein when the projection device projects the projection image, the processing device is configured to directly set an image format of the projection image according to the setting signal provided by the input interface in response to selection of one of the setting items.

2. The projection apparatus as claimed in claim 1, wherein the input interface is a physical unit set on a body of the projection apparatus, and the physical unit comprises a plurality of switching states for corresponding to the setting items.

3. The projection apparatus as claimed in claim 1, wherein the input interface is a physical unit set on a remote control device corresponding to the projection apparatus, and the physical unit comprises a plurality of switching states for corresponding to the setting items.

4. The projection apparatus as claimed in claim 1, wherein the input interface comprises a knob, and the knob schematically points to one of the setting items,
wherein the knob selects one of the setting items in response to rotation of the knob to output the setting signal to the processing device.

5. The projection apparatus as claimed in claim 1, wherein the input interface comprises a plurality of buttons, and the buttons respectively correspond to the setting items,
wherein the buttons select one of the setting items in response to pressing of one of the buttons to output the setting signal to the processing device.

6. The projection apparatus as claimed in claim 1, wherein the setting items comprise a normal projection item, and the input interface correspondingly provides the setting signal to the processing device in response to selection of the normal projection item, and the processing device directly sets the projection device to project the projection image in a normal projection mode.

7. The projection apparatus as claimed in claim 1, wherein the setting items comprise a special projection item, and the input interface correspondingly provides the setting signal to the processing device in response to selection of the special projection item, such that the processing device directly sets the projection device to project the projection image in a special projection mode.

8. The projection apparatus as claimed in claim 1, wherein the specific high-speed frame update rate is 240 Hz.

9. The projection apparatus as claimed in claim 1, wherein the setting items comprise a frame ratio setting item, and the input interface correspondingly provides the setting signal to the processing device in response to selection of the frame ratio setting item, such that the processing device directly sets the projection device to project the projection image at a specific frame ratio, wherein the specific frame ratio is 32:9.

10. The projection apparatus as claimed in claim 1, wherein the setting items comprise a frame brightness setting item, and the input interface correspondingly provides the setting signal to the processing device in response to selection of the frame brightness setting item, such that the processing device directly sets the projection device to project the projection image at a specific frame brightness, wherein the specific frame brightness is used to enhance image details of a dark portion in the projection image.

11. A direct setting method of a projection image, adapted to projection apparatus comprising a projection device, an input interface, and a processing device, the direct setting method comprising:
projecting the projection image through the projection device;
providing a setting signal provided by the input interface in response to selection of one of a plurality of setting items to the processing device, wherein the setting items comprise a frame update rate setting item, and the input interface correspondingly provides a first setting signal to the processing device in response to selection of the frame update rate setting item, such that the processing device directly sets the projection device to project the projection image at a specific high-speed frame update rate; and
directly setting an image format of the projection image by the processing device according to the setting signal.

12. The direct setting method of the projection image as claimed in claim 11, wherein the input interface is a physical unit set on a body of the projection apparatus, and the physical unit comprises a plurality of switching states for corresponding to the setting items.

13. The direct setting method of the projection image as claimed in claim 11, wherein the input interface is a physical unit set on a remote control device corresponding to the projection apparatus, and the physical unit comprises a plurality of switching states for corresponding to the setting items.

14. The direct setting method of the projection image as claimed in claim 11, wherein the input interface comprises a knob, and the knob schematically points to one of the setting items, wherein the step of providing the setting signal provided by the input interface in response to selection of one of a plurality of setting items to the processing device comprises:
selecting one of the setting items by the knob in response to rotation of the knob to output the setting signal to the processing device.

15. The direct setting method of the projection image as claimed in claim 11, wherein the input interface comprises a plurality of buttons, and the buttons respectively correspond to the setting items, wherein the step of providing the setting signal provided by the input interface in response to selection of one of a plurality of setting items to the processing device comprises:
selecting one of the setting items by the buttons in response to pressing of one of the buttons to output the setting signal to the processing device.

16. The direct setting method of the projection image as claimed in claim 11, wherein the setting items comprise a normal projection item, and the input interface correspondingly provides a second setting signal to the processing device in response to selection of the normal projection item, and the processing device directly sets the projection device to project the projection image in a normal projection mode.

17. The direct setting method of the projection image as claimed in claim 11, wherein the setting items comprise a special projection item, and the input interface correspondingly provides a third setting signal to the processing device in response to selection of the special projection item, and the processing device directly sets the projection device to project the projection image in a special projection mode.

18. The direct setting method of the projection image as claimed in claim 11, wherein the specific high-speed frame update rate is 240 Hz.

19. The direct setting method of the projection image as claimed in claim 11, wherein the setting items comprise a frame ratio setting item, and the input interface correspondingly provides a fourth setting signal to the processing device in response to selection of the frame ratio setting item, such that the processing device directly sets the projection device to project the projection image at a specific frame ratio, wherein the specific frame ratio is 32:9.

20. The direct setting method of the projection image as claimed in claim 11, wherein the setting items comprise a frame brightness setting item, and the input interface correspondingly provides a fifth setting signal to the processing device in response to selection of the frame brightness setting item, such that the processing device directly sets the projection device to project the projection image at a specific frame brightness, wherein the specific frame brightness is used to enhance image details of a dark portion in the projection image.

* * * * *